Aug. 22, 1950     J. H. HETT     2,519,760
LENS SYSTEM FOR GASTROSCOPES OR THE LIKE
Filed Feb. 16, 1949
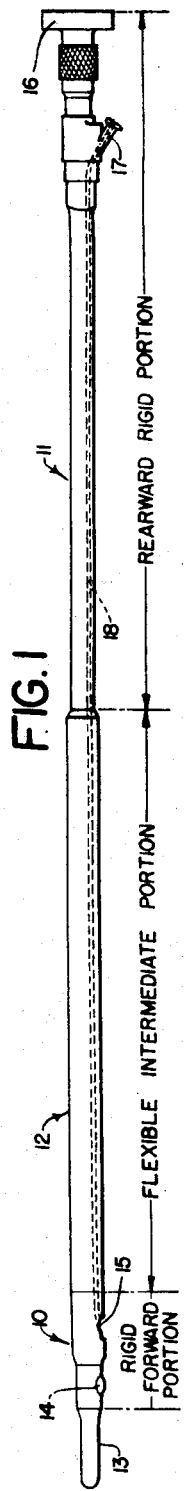
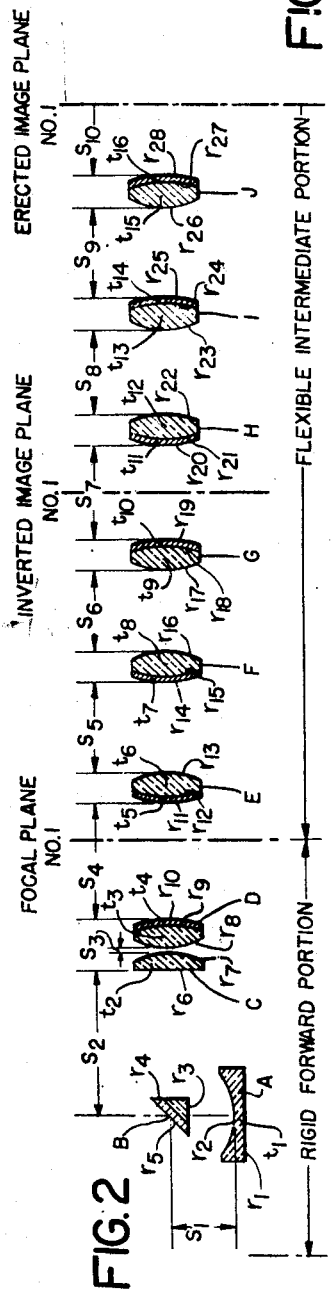
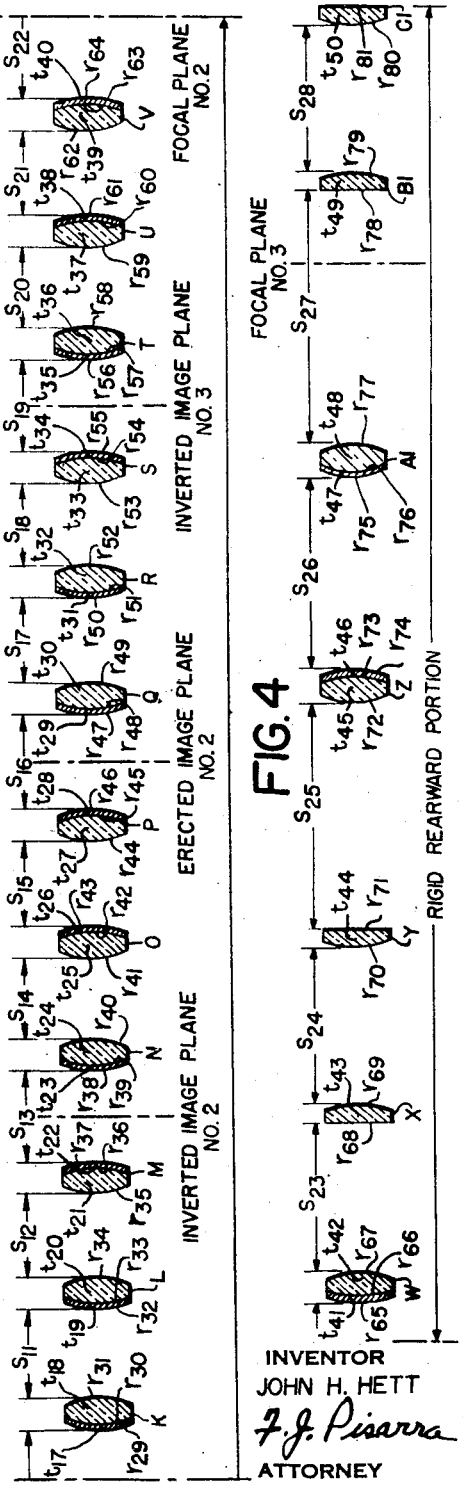
INVENTOR
JOHN H. HETT
F. J. Pisarra
ATTORNEY Patented Aug. 22, 1950

2,519,760

UNITED STATES PATENT OFFICE 2,519,760

LENS SYSTEM FOR GASTROSCOPES OR THE LIKE

John H. Hett, New York, N. Y., assignor to American Cystoscope Makers, Inc., New York, N. Y., a corporation of New York Application February 16, 1949, Serial No. 76,823

8 Claims. (Cl. 88—57)

This invention relates to gastroscopes or the like, and more particularly to lens systems therefor.

It is the primary object of the invention to provide improved lens systems for gastroscopes or the like.

This, as well as other objects, together with the advantages attainable by the practice of the invention, will be readily understood by persons skilled in the art upon reference to the detailed discussion that follows, taken in conjunction with the attached drawing, which respectively describe and illustrate a preferred embodiment of the invention.

In the drawing:

Figure 1 is a view in side elevation of a gastroscope or related instrument;

Figure 2 is a longitudinal cross section of the lens system housed in the rigid forward portion and the forward third of the flexible intermediate portion of the instrument of Figure 1;

Figure 3 is a longitudinal cross section of the lens system in the rearward two thirds of the flexible intermediate portion of the instrument of Figure 1; and Figure 4 is a longitudinal cross section of the lens system housed in the rigid rearward portion of the instrument of Figure 1.

Referring now to the drawing, and more especially to Figure 1, the gastroscope illustrated therein comprises a rigid forward portion 10, a rigid rearward portion 11, and a flexible portion 12 positioned intermediate and connected to the rigid portions. Rigid forward portion 10 is provided with a rounded tip 13 at its forward extremity to facilitate insertion and removal of the instrument into and from the stomach through the esophagus. Forward portion 10 is provided with a lamp 14 for supplying illumination in a body passage or cavity, and an opening 15 through which a catheter or other instrumentality may be moved. Rearward portion 11 carries an eyepiece 16 and is provided with a guide tube 17. A longitudinal passage 18 within portions 11 and 12 establishes communication with opening 15 and guide tube 17, whereby a catheter or other instrumentality may be inserted in tube 17, moved forwardly through passage 18, and emerge from the instrument though opening 15.

The lens systems contained in portions 10, 11 and 12 are shown in Figures 2 and 4. The lens system in forward portion 10 is in the nature of an inverted Galilean arrangement of lenses with an Amici prism B at the right angle, and constitutes the objective of the instrument. The image formed by the objective is picked up by a multiple relay system consisting of units of three lenses each, as viewed in Figure 2, and starting with focal plane No. 1 and reading to the right. The focal planes precede and follow each of these units, inverted and erected image planes being identified in the drawing.

The arrangement of the lenses in flexible portion 12 is an outstanding feature of the invention as it permits that portion of the instrument to be bent at a relatively high angle and still retain the field of view of the instrument which is 55° at unit power in the instant arrangement. The last image, after passing through the lenses of the flexible portion, is picked up and transmitted through the lens system in rearward portion 11 of the instrument.

As will be noted from an examination of Figure 2 and the tables that follow, the complete lens system of flexible portion 12 consists of three identical sets of six lenses. Each such set of lenses permits deflection of approximately 10° of rearward portion 11 with respect to forward portion 10 without total occlusion. Thus, in the illustated embodiment, section 11 may be deflected approximately 30° with respect to section 10. If two sets of six lenses are employed, the degree of deflection is approximately 20° without total occlusion. Total available deflection with the illustrated embodiment of the invention is 30° without total occlusion.

The tables that appear further along herein set forth the characteristics and relationship of the lenses in each of instrument portions 10, 11 and 12.

In each table:

"Lens" identifies the lenses by the same letters appearing in the drawing;

"Radii" indicates the radii of the spherical surfaces on the faces of the lenses, positive and negative radii indicating surfaces that are convex forwardly and rearwardly, respectively;

"Thickness" indicates the thickness of the lens and the air gaps between lenses, as measured on the axes of the lenses, the axes of lenses C—$C_1$ being substantially coincident and normal to the axis of lens A;

"$N_D$" denotes the index of refraction of the optical glass of the lens;

"V" denotes the dispersion factor of the optical glass of the lens; and

"Glass" identifies the composition of the lens, "B. S. C." denoting borosilicate crown glass, "D. B. C." denoting dense barium crown glass, "E. D. F." denoting extra dense flint glass, and "Cr." denoting crown glass.

The radii, thicknesses and air gaps are all measured in the same linear units.

Table I below specifies the characteristics and relationship of the lenses that constitute the lens system in rigid forward portion 10 of the instrument.

Table I

| Lens | Radii, mm. | Thickness, mm. | $N_D$ | V | Glass |
|---|---|---|---|---|---|
| A | $r_1=\infty$<br>$r_2=+ 3.102$ | $t_1= 0.5$<br>$s_1= 5.0$ | 1.517 | 64.5 | B. S. C. |
| B | $r_3=\infty$<br>$r_4=\infty$<br>$r_5=\infty$ | | 1.617 | 55.0 | D. B. C. |
| C | $r_6=\infty$<br>$r_7=-15.51$ | $s_2=16.16$<br>$t_2= 1.50$<br>$s_3= 1.0$ | 1.517 | 64.5 | B. S. C. |
| D | $r_8=+ 9.294$<br>$r_9=- 6.204$<br>$r_{10}=-20.158$ | $t_3= 2.00$<br>$t_4= 0.45$ | 1.517<br>1.649 | 64.5<br>33.8 | B. S. C.<br>E. D. F. |

Table II below specifies the characteristics and relationship of the lenses that constitute the complete lens system in flexible intermediate portion 12 of the instrument.

Table II

| Lens | Radii, mm. | Thickness, mm. | $N_D$ | V | Glass |
|---|---|---|---|---|---|
| E | $r_{11}=+ 8.820$<br>$r_{12}=+ 3.947$<br>$r_{13}=-20.404$ | $t_5= 0.45$<br>$t_6= 2.00$<br>$s_5=13.52$ | 1.649<br>1.523 | 33.8<br>58.6 | E. D. F.<br>Cr. |
| F | $r_{14}=+ 8.820$<br>$r_{15}=+ 3.947$<br>$r_{16}=-20.404$ | $t_7= 0.45$<br>$t_8= 2.00$<br>$s_6=12.86$ | 1.649<br>1.523 | 33.8<br>58.6 | E. D. F.<br>Cr. |
| G | $r_{17}=+20.404$<br>$r_{18}=- 3.947$<br>$r_{19}=- 8.820$ | $t_9= 2.00$<br>$t_{10}= 0.45$<br>$s_7=14.8$ | 1.523<br>1.649 | 58.6<br>33.8 | Cr.<br>E. D. F. |
| H | $r_{20}=+ 8.820$<br>$r_{21}=+ 3.947$<br>$r_{22}=-20.404$ | $t_{11}= 0.45$<br>$t_{12}= 2.00$<br>$s_8=12.86$ | 1.649<br>1.523 | 33.8<br>58.6 | E. D. F.<br>Cr. |
| I | $r_{23}=+20.404$<br>$r_{24}=- 3.947$<br>$r_{25}=- 8.820$ | $t_{13}= 2.00$<br>$t_{14}= 0.45$<br>$s_9=13.52$ | 1.523<br>1.649 | 58.6<br>33.8 | Cr.<br>E. D. F. |
| J | $r_{26}=+20.404$<br>$r_{27}=- 3.947$<br>$r_{28}=- 8.820$ | $t_{15}= 2.00$<br>$t_{16}= 0.45$<br>$s_{10}=14.18$ | 1.523<br>1.649 | 58.6<br>33.8 | Cr.<br>E. D. F. |
| K | $r_{29}=+ 8.820$<br>$r_{30}=+ 3.947$<br>$r_{31}=-20.404$ | $t_{17}= 0.45$<br>$t_{18}= 2.00$<br>$s_{11}=13.52$ | 1.649<br>1.523 | 33.8<br>58.6 | E. D. F.<br>Cr. |
| L | $r_{32}=+ 8.820$<br>$r_{33}=+ 3.947$<br>$r_{34}=-20.404$ | $t_{19}= 0.45$<br>$t_{20}= 2.00$<br>$s_{12}=12.86$ | 1.649<br>1.523 | 33.8<br>58.6 | E. D. F.<br>Cr. |
| M | $r_{35}=+20.404$<br>$r_{36}=- 3.947$<br>$r_{37}=- 8.820$ | $t_{21}= 2.00$<br>$t_{22}= 0.45$<br>$s_{13}=14.18$ | 1.523<br>1.649 | 58.6<br>33.8 | Cr.<br>E. D. F. |
| N | $r_{38}=+ 8.820$<br>$r_{39}=+ 3.947$<br>$r_{40}=-20.404$ | $t_{23}= 0.45$<br>$t_{24}= 2.00$<br>$s_{14}=12.86$ | 1.649<br>1.523 | 33.8<br>58.6 | E. D. F.<br>Cr. |
| O | $r_{41}=+20.404$<br>$r_{42}=- 3.947$<br>$r_{43}=- 8.820$ | $t_{25}= 2.00$<br>$t_{26}= 0.45$<br>$s_{15}=13.52$ | 1.523<br>1.649 | 58.6<br>33.8 | Cr.<br>E. D. F. |
| P | $r_{44}=+20.404$<br>$r_{45}=- 3.947$<br>$r_{46}=- 8.820$ | $t_{27}= 2.00$<br>$t_{28}= 0.45$<br>$s_{16}=14.18$ | 1.523<br>1.649 | 58.6<br>33.8 | Cr.<br>E. D. F. |
| Q | $r_{47}=+ 8.820$<br>$r_{48}=+ 3.947$<br>$r_{49}=-20.404$ | $t_{29}= 0.45$<br>$t_{30}= 2.00$<br>$s_{17}=13.52$ | 1.649<br>1.523 | 33.8<br>58.6 | E. D. F.<br>Cr. |
| R | $r_{50}=+ 8.820$<br>$r_{51}=+ 3.947$<br>$r_{52}=-20.404$ | $t_{31}= 0.45$<br>$t_{32}= 2.00$<br>$s_{18}=12.86$ | 1.649<br>1.523 | 33.8<br>58.6 | E. D. F.<br>Cr. |
| S | $r_{53}=+20.404$<br>$r_{54}=- 3.947$<br>$r_{55}=- 8.820$ | $t_{33}= 2.00$<br>$t_{34}= 0.45$<br>$s_{19}=14.18$ | 1.523<br>1.649 | 58.6<br>33.8 | Cr.<br>E. D. F. |
| T | $r_{56}=+ 8.820$<br>$r_{57}=+ 3.947$<br>$r_{58}=-20.404$ | $t_{35}= 0.45$<br>$t_{36}= 2.00$<br>$s_{20}=12.86$ | 1.649<br>1.523 | 33.8<br>58.6 | E. D. F.<br>Cr. |
| U | $r_{59}=+20.404$<br>$r_{60}=- 3.947$<br>$r_{61}=- 8.820$ | $t_{37}= 2.00$<br>$t_{38}= 0.45$<br>$s_{21}=13.52$ | 1.523<br>1.649 | 58.6<br>33.8 | Cr.<br>E. D. F. |
| V | $r_{62}=+20.404$<br>$r_{63}=- 3.947$<br>$r_{64}=- 8.820$ | $t_{39}= 2.00$<br>$t_{40}= 0.45$ | 1.523<br>1.649 | 58.6<br>33.8 | Cr.<br>E. D. F. |

Table III below specifies the characteristics and relationship of the lenses that constitute the lens system in rigid rearward portion 14 of the instrument.

Table III

| Lens | Radii, mm. | Thickness, mm. | $N_D$ | V | Glass |
|---|---|---|---|---|---|
| W | $r_{65}=+ 20.158$<br>$r_{66}=+ 6.204$<br>$r_{67}=- 9.294$ | $t_{41}= 0.45$<br>$t_{42}= 2.00$<br>$s_{23}=21.96$ | 1.649<br>1.517 | 33.8<br>64.5 | E. D. F.<br>B. S. C. |
| X | $r_{68}=\infty$<br>$r_{69}=- 19.444$ | $t_{43}=2.50$<br>$s_{24}=26.05$ | 1.523 | 58.6 | Cr. |
| Y | $r_{70}=+ 24.334$<br>$r_{71}=\infty$ | $t_{44}= 2.50$<br>$s_{25}=96.76$ | 1.523 | 58.6 | Cr. |
| Z | $r_{72}=+115.610$<br>$r_{73}=- 24.010$<br>$r_{74}=- 34.724$ | $t_{45}= 2.50$<br>$t_{46}= 1.00$<br>$s_{26}=90.00$ | 1.523<br>1.649 | 58.6<br>33.8 | Cr.<br>E. D. F. |
| $A_1$ | $r_{75}=+ 34.724$<br>$r_{76}=+ 24.010$<br>$r_{77}=-115.610$ | $t_{47}= 1.00$<br>$t_{48}= 2.50$<br>$s_{27}=95.43$ | 1.649<br>1.523 | 33.8<br>58.6 | E. D. F.<br>Cr. |
| $B_1$ | $r_{78}=\infty$<br>$r_{79}=+ 20.278$ | $t_{49}= 2.25$<br>$s_{28}=21.70$ | 1.523 | 58.6 | Cr. |
| $C_1$ | $r_{80}=+ 16.203$<br>$r_{81}=\infty$ | $t_{50}= 2.25$ | 1.523 | 58.6 | Cr. |

In the illustrated embodiment of the invention, $s_4$, the air gap between lenses D and E, is 21.21 mm., while $s_{22}$, the air gap between lenses V and W, is 21.10 mm.

In the instrument shown in the drawing and having incorporated therein the complete lens systems specified in the foregoing table, (1) the true field of vision=55°; (2) the entrance pupil= 0.4 mm.; (3) the exit pupil=1.67 mm.; (4) the working distance=80-35 mm.; and (5) the overall length of the instrument=703.52 mm.

The aberrations at the rearwardmost focal plane (focal plane No. 3) are as follows:

Spherical aberration +.05 mm.
Offense against sine condition −.0016.
Color difference in focus −.54 mm.
Sagittal astigmatism −2.14.
Tangential astigmatism +.50.
Distortion −12%.

The aperture at lens A=6.0 mm., the aperture at each of lenses Z, $A_1$, and $B_1$=5.5 mm., and the aperture at each of the remaining lenses=5.3 mm. The distance from the rearward face of lens $C_1$ to the normal position of the eye of the user is 14.8 mm.

Having thus described in detail the preferred embodiment of my invention, it is to be understood that the invention is not limited to the particular lens arrangement shown but is of the scope of the appended claims.

I claim:

1. An arrangement of lenses for a gastroscope or the like comprising at least one lens system in accordance with the following table:

| Lens | Radii, mm. | Thickness, mm. | $N_D$ | V | Glass |
|---|---|---|---|---|---|
| E | $r_{11}=+ 8.820$<br>$r_{12}=+ 3.947$<br>$r_{13}=-20.404$ | $t_5= 0.45$<br>$t_6= 2.00$<br>$s_5=13.52$ | 1.649<br>1.523 | 33.8<br>58.6 | E. D. F.<br>Cr. |
| F | $r_{14}=+ 8.820$<br>$r_{15}=+ 3.947$<br>$r_{16}=-20.404$ | $t_7= 0.45$<br>$t_8= 2.00$<br>$s_6=12.86$ | 1.649<br>1.523 | 33.8<br>58.6 | E. D. F.<br>Cr. |
| G | $r_{17}=+20.404$<br>$r_{18}=- 3.947$<br>$r_{19}=- 8.820$ | $t_9= 2.00$<br>$t_{10}= 0.45$<br>$s_7=14.8$ | 1.523<br>1.649 | 58.6<br>33.8 | Cr.<br>E. D. F. |
| H | $r_{20}=+ 8.820$<br>$r_{21}=+ 3.947$<br>$r_{22}=-20.404$ | $t_{11}= 0.45$<br>$t_{12}= 2.00$<br>$s_8=12.86$ | 1.649<br>1.523 | 33.8<br>58.6 | E. D. F.<br>Cr. |
| I | $r_{23}=+20.404$<br>$r_{24}=- 3.947$<br>$r_{25}=- 8.820$ | $t_{13}= 2.00$<br>$t_{14}= 0.45$<br>$s_9=13.52$ | 1.523<br>1.649 | 58.6<br>33.8 | Cr.<br>E. D. F. |
| J | $r_{26}=+20.404$<br>$r_{27}=- 3.947$<br>$r_{28}=- 8.820$ | $t_{15}= 2.00$<br>$t_{16}= 0.45$ | 1.523<br>1.649 | 58.6<br>33.8 | Cr.<br>E. D. F. | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axis of the lens system; $N_D$ denotes the index of refraction of the optical glass of the lens; and $V$ denotes the dispersion factor of the optical glass of the lens, all of said radii, thicknesses and air gaps being measured in the same linear units.

2. A lens system for a gastroscope or the like in accordance with the following table:

| Lens | Radii, mm. | Thickness, mm. | $N_D$ | $V$ | Glass |
|---|---|---|---|---|---|
| A | $r_1=\infty$ | $t_1=0.5$ | 1.517 | 64.5 | B. S. C. |
|  | $r_2=+3.102$ | $s_1=5.0$ |  |  |  |
| B | $r_3=\infty$ |  | 1.617 | 55.0 | D. B. C. |
|  | $r_4=\infty$ |  |  |  |  |
|  | $r_5=\infty$ | $s_2=16.16$ |  |  |  |
| C | $r_6=\infty$ | $t_2=1.50$ | 1.517 | 64.5 | B. S. C. |
|  | $r_7=-15.51$ | $s_3=1.0$ |  |  |  |
| D | $r_8=+9.294$ | $t_3=2.00$ | 1.517 | 64.5 | B. S. C. |
|  | $r_9=-6.204$ |  |  |  |  |
|  | $r_{10}=-20.158$ | $t_4=0.45$ | 1.649 | 33.8 | E. D. F. | wherein $r$ indicates the radius of a spherical surface on the face of the lens, positive and negative radii indicating surfaces that are convex generally forwardly and rearwardly, respectively; $t$ indicates the thickness of the lens; $s$ indicates the air gap between successive lenses measured on the axes of the lenses, the axes of lenses C and D being substantially coincident and normal to the axis of lens A; $N_D$ denotes the index of refraction of the optical glass of the lens; and $V$ denotes the dispersion factor of the optical glass of the lens, all of said radii, thicknesses and air gaps being measured in the same linear units.

3. A lens system for a gastroscope or the like in accordance with the following table:

| Lens | Radii, mm. | Thickness, mm. | $N_D$ | $V$ | Glass |
|---|---|---|---|---|---|
| W | $r_{65}=+20.158$ | $t_{41}=0.45$ | 1.649 | 33.8 | E. D. F. |
|  | $r_{66}=+6.204$ |  |  |  |  |
|  | $r_{67}=-9.294$ | $t_{42}=2.00$ | 1.517 | 64.5 | B. S. C. |
|  |  | $s_{23}=21.96$ |  |  |  |
| X | $r_{68}=\infty$ | $t_{43}=2.50$ | 1.523 | 58.6 | Cr. |
|  | $r_{69}=-19.444$ |  |  |  |  |
|  |  | $s_{24}=26.05$ |  |  |  |
| Y | $r_{70}=+24.334$ | $t_{44}=2.50$ | 1.523 | 58.6 | Cr. |
|  | $r_{71}=\infty$ |  |  |  |  |
|  |  | $s_{25}=96.76$ |  |  |  |
| Z | $r_{72}=+115.610$ | $t_{45}=2.50$ | 1.523 | 58.6 | Cr. |
|  | $r_{73}=-24.010$ |  |  |  |  |
|  | $r_{74}=-34.724$ | $t_{46}=1.00$ | 1.649 | 33.8 | E. D. F. |
|  |  | $s_{26}=90.00$ |  |  |  |
| $A_1$ | $r_{75}=+34.724$ | $t_{47}=1.00$ | 1.649 | 33.8 | E. D. F. |
|  | $r_{76}=+24.010$ |  |  |  |  |
|  | $r_{77}=-115.610$ | $t_{48}=2.50$ | 1.523 | 58.6 | Cr. |
|  |  | $s_{27}=95.43$ |  |  |  |
| $B_1$ | $r_{78}=\infty$ | $t_{49}=2.25$ | 1.523 | 58.6 | Cr. |
|  | $r_{79}=-20.278$ |  |  |  |  |
|  |  | $s_{28}=21.70$ |  |  |  |
| $C_1$ | $r_{80}=+16.203$ | $t_{50}=2.25$ | 1.523 | 58.6 | Cr. |
|  | $r_{81}=\infty$ |  |  |  |  | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axis of the lens system; $N_D$ denotes the index of refraction of the optical glass of the lens, and $V$ denotes the dispersion factor of the optical glass of the lens, all of said radii, thicknesses and air gaps being measured in the same linear units.

4. In a gastroscope or the like, a flexible portion and a rigid portion connected to and constituting a continuation of the flexible portion, said flexible portion including at least one lens system in accordance with the following table:

| Lens | Radii, mm. | Thickness, mm. | $N_D$ | $V$ | Glass |
|---|---|---|---|---|---|
| E | $r_{11}=+8.820$ | $t_5=0.45$ | 1.649 | 33.8 | E. D. F. |
|  | $r_{12}=+3.947$ |  |  |  |  |
|  | $r_{13}=-20.404$ | $t_6=2.00$ | 1.523 | 58.6 | Cr. |
|  |  | $s_5=13.52$ |  |  |  |
| F | $r_{14}=+8.820$ | $t_7=0.45$ | 1.649 | 33.8 | E. D. F. |
|  | $r_{15}=+3.947$ |  |  |  |  |
|  | $r_{16}=-20.404$ | $t_8=2.00$ | 1.523 | 58.6 | Cr. |
|  |  | $s_6=12.86$ |  |  |  |
| G | $r_{17}=+20.404$ | $t_9=2.00$ | 1.523 | 58.6 | Cr. |
|  | $r_{18}=-3.947$ |  |  |  |  |
|  | $r_{19}=-8.820$ | $t_{10}=0.45$ | 1.649 | 33.8 | E. D. F. |
|  |  | $s_7=14.8$ |  |  |  |
| H | $r_{20}=+8.820$ | $t_{11}=0.45$ | 1.649 | 33.8 | E. D. F. |
|  | $r_{21}=+3.947$ |  |  |  |  |
|  | $r_{22}=-20.404$ | $t_{12}=2.00$ | 1.523 | 58.6 | Cr. |
|  |  | $s_8=12.86$ |  |  |  |
| I | $r_{23}=+20.404$ | $t_{13}=2.00$ | 1.523 | 58.6 | Cr. |
|  | $r_{24}=-3.947$ |  |  |  |  |
|  | $r_{25}=-8.820$ | $t_{14}=0.45$ | 1.649 | 33.8 | E. D. F. |
|  |  | $s_9=13.52$ |  |  |  |
| J | $r_{26}=+20.404$ | $t_{15}=2.00$ | 1.523 | 58.6 | Cr. |
|  | $r_{27}=-3.947$ |  |  |  |  |
|  | $r_{28}=-8.820$ | $t_{16}=0.45$ | 1.649 | 33.8 | E. D. F. |
|  |  | $s_{10}=14.18$ |  |  |  | said rigid portion including a lens system in accordance with the following table:

| Lens | Radii, mm. | Thickness, mm. | $N_D$ | $V$ | Glass |
|---|---|---|---|---|---|
| W | $r_{65}=+20.158$ | $t_{41}=0.45$ | 1.649 | 33.8 | E. D. F. |
|  | $r_{66}=+6.204$ |  |  |  |  |
|  | $r_{67}=-9.294$ | $t_{42}=2.00$ | 1.517 | 64.5 | B. S. C. |
|  |  | $s_{23}=21.96$ |  |  |  |
| X | $r_{68}=\infty$ | $t_{43}=2.50$ | 1.523 | 58.6 | Cr. |
|  | $r_{69}=-19.444$ |  |  |  |  |
|  |  | $s_{24}=26.05$ |  |  |  |
| Y | $r_{70}=+24.334$ | $t_{44}=2.50$ | 1.523 | 58.6 | Cr. |
|  | $r_{71}=\infty$ |  |  |  |  |
|  |  | $s_{25}=96.76$ |  |  |  |
| Z | $r_{72}=+115.610$ | $t_{45}=2.50$ | 1.523 | 58.6 | Cr. |
|  | $r_{73}=-24.010$ |  |  |  |  |
|  | $r_{74}=-34.724$ | $t_{46}=1.00$ | 1.649 | 33.8 | E. D. F. |
|  |  | $s_{26}=90.00$ |  |  |  |
| $A_1$ | $r_{75}=+34.724$ | $t_{47}=1.00$ | 1.649 | 33.8 | E. D. F. |
|  | $r_{76}=+24.010$ |  |  |  |  |
|  | $r_{77}=-115.610$ | $t_{48}=2.50$ | 1.523 | 58.6 | Cr. |
|  |  | $s_{27}=95.43$ |  |  |  |
| $B_1$ | $r_{78}=\infty$ | $t_{49}=2.25$ | 1.523 | 58.6 | Cr. |
|  | $r_{79}=-20.278$ |  |  |  |  |
|  |  | $s_{28}=21.70$ |  |  |  |
| $C_1$ | $r_{80}=+16.203$ | $t_{50}=2.25$ | 1.523 | 58.6 | Cr. |
|  | $r_{81}=\infty$ |  |  |  |  | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axis of the lens system; $N_D$ denotes the index of refraction of the optical glass of the lens; and $V$ denotes the dispersion factor of the optical glass of the lens, all of said radii, thicknesses and air gaps being measured in the same linear units.

5. In a gastroscope or the like, a rigid forward portion, a rigid rearward portion and a flexible portion connected to and positioned intermediate the forward and rearward portions, said forward portion including a lens system in accordance with the following table:

| Lens | Radii, mm. | Thickness, mm. | $N_D$ | V | Glass |
|---|---|---|---|---|---|
| A | $r_1=\infty$ $r_2=+3.102$ | $t_1=0.5$ | 1.517 | 64.5 | B. S. C. |
| | | $s_1=5.0$ | | | |
| B | $r_3=\infty$ $r_4=\infty$ $r_5=\infty$ | | 1.617 | 55.0 | D. B. C. |
| | | $s_2=16.16$ | | | |
| C | $r_6=\infty$ $r_7=-15.51$ | $t_2=1.50$ | 1.517 | 64.5 | B. S. C. |
| | | $s_3=1.0$ | | | |
| D | $r_8=+9.294$ $r_9=-6.204$ $r_{10}=-20.158$ | $t_3=2.00$ $t_4=0.45$ | 1.517 1.649 | 64.5 33.8 | B. S. C. E. D. F. | said intermediate portion including at least one lens system in accordance with the following table:

| Lens | Radii, mm. | Thickness, mm. | $N_D$ | V | Glass |
|---|---|---|---|---|---|
| E | $r_{11}=+8.820$ $r_{12}=+3.947$ $r_{13}=-20.404$ | $t_5=0.45$ $t_6=2.00$ | 1.649 1.523 | 33.8 58.6 | E. D. F. Cr. |
| | | $s_5=13.52$ | | | |
| F | $r_{14}=+8.820$ $r_{15}=+3.947$ $r_{16}=-20.404$ | $t_7=0.45$ $t_8=2.00$ | 1.649 1.523 | 33.8 58.6 | E. D. F. Cr. |
| | | $s_6=12.86$ | | | |
| G | $r_{17}=+20.404$ $r_{18}=-3.947$ $r_{19}=-8.820$ | $t_9=2.00$ $t_{10}=0.45$ | 1.523 1.649 | 58.6 33.8 | Cr. E. D. F. |
| | | $s_7=14.8$ | | | |
| H | $r_{20}=+8.820$ $r_{21}=+3.947$ $r_{22}=-20.404$ | $t_{11}=0.45$ $t_{12}=2.00$ | 1.649 1.523 | 33.8 58.6 | E. D. F. Cr. |
| | | $s_8=12.86$ | | | |
| I | $r_{23}=+20.404$ $r_{24}=-3.947$ $r_{25}=-8.820$ | $t_{13}=2.00$ $t_{14}=0.45$ | 1.523 1.649 | 58.6 33.8 | Cr. E. D. F. |
| | | $s_9=13.52$ | | | |
| J | $r_{26}=+20.404$ $r_{27}=-3.947$ $r_{28}=-8.820$ | $t_{15}=2.00$ $t_{16}=0.45$ | 1.523 1.649 | 58.6 33.8 | Cr. E. D. F. |
| | | $s_{10}=14.18$ | | | | said rearward portion including a lens system in accordance with the following table:

| Lens | Radii, mm. | Thickness, mm. | $N_D$ | V | Glass |
|---|---|---|---|---|---|
| W | $r_{65}=+20.158$ $r_{66}=+6.204$ $r_{67}=-9.294$ | $t_{41}=0.45$ $t_{42}=2.00$ | 1.649 1.517 | 33.8 64.5 | E. D. F. B. S. C |
| | | $s_{23}=21.96$ | | | |
| X | $r_{68}=\infty$ $r_{69}=-19.444$ | $t_{43}=2.50$ | 1.523 | 58.6 | Cr. |
| | | $s_{24}=26.05$ | | | |
| Y | $r_{70}=+24.334$ $r_{71}=\infty$ | $t_{44}=2.50$ | 1.523 | 58.6 | Cr. |
| | | $s_{25}=96.76$ | | | |
| Z | $r_{72}=+115.610$ $r_{73}=-24.010$ $r_{74}=-34.724$ | $t_{45}=2.50$ $t_{46}=1.00$ | 1.523 1.649 | 58.6 33.8 | Cr. E. D. F. |
| | | $s_{26}=90.00$ | | | |
| $A_1$ | $r_{75}=+34.724$ $r_{76}=+24.010$ $r_{77}=-115.610$ | $t_{47}=1.00$ $t_{48}=2.50$ | 1.649 1.523 | 33.8 58.6 | E. D. F. Cr. |
| | | $s_{27}=95.43$ | | | |
| $B_1$ | $r_{78}=\infty$ $r_{79}=-20.278$ | $t_{49}=2.25$ | 1.523 | 58.6 | Cr. |
| | | $s_{28}=21.70$ | | | |
| $C_1$ | $r_{80}=+16.203$ $r_{81}=\infty$ | $t_{50}=2.25$ | 1.523 | 58.6 | Cr. | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axes of the lenses, the axes of lenses C to $C_1$, inclusive, being substantially coincident and normal to the axis of lens A; $N_D$ denotes the index of refraction of the optical glass of the lens; and V denotes the dispersion factor of the optical glass of the lens, all of said radii, thicknesses and air gaps being measured in the same linear units.

6. A lens system for a gastroscope or the like in accordance with the following table:

| Lens | Radii, mm. | Thickness, mm. | $N_D$ | V | Glass |
|---|---|---|---|---|---|
| E | $r_{11}=+6.820$ $r_{12}=+3.947$ $r_{13}=-20.404$ | $t_5=0.45$ $t_6=2.00$ | 1.649 1.523 | 33.8 58.6 | E. D. F. Cr. |
| | | $s_5=13.52$ | | | |
| F | $r_{14}=+8.820$ $r_{15}=+3.947$ $r_{16}=-20.404$ | $t_7=0.45$ $t_8=2.00$ | 1.649 1.523 | 33.8 58.6 | E. D. F. Cr. |
| | | $s_6=12.86$ | | | |
| G | $r_{17}=+20.404$ $r_{18}=-3.947$ $r_{19}=-8.820$ | $t_9=2.00$ $t_{10}=0.45$ | 1.523 1.649 | 58.6 33.8 | Cr. E. D. F. |
| | | $s_7=14.8$ | | | |
| H | $r_{20}=+8.820$ $r_{21}=+3.947$ $r_{22}=-20.404$ | $t_{11}=0.45$ $t_{12}=2.00$ | 1.649 1.523 | 33.8 58.6 | E. D. F. Cr. |
| | | $s_8=12.86$ | | | |
| I | $r_{23}=+20.404$ $r_{24}=-3.947$ $r_{25}=-8.820$ | $t_{13}=2.00$ $t_{14}=0.45$ | 1.523 1.649 | 58.6 33.8 | Cr. E. D. F. |
| | | $s_9=13.52$ | | | |
| J | $r_{26}=+20.404$ $r_{27}=+3.947$ $r_{28}=-8.820$ | $t_{15}=2.00$ $t_{16}=0.45$ | 1.523 1.649 | 58.6 33.8 | Cr. E. D. F. |
| | | $s_{10}=14.18$ | | | |
| K | $r_{29}=+8.820$ $r_{30}=+3.947$ $r_{31}=-20.404$ | $t_{17}=0.45$ $t_{18}=2.00$ | 1.649 1.523 | 33.8 58.6 | E. D. F. Cr. |
| | | $s_{11}=13.52$ | | | |
| L | $r_{32}=+8.820$ $r_{33}=+3.947$ $r_{34}=-20.404$ | $t_{19}=0.45$ $t_{20}=2.00$ | 1.649 1.523 | 33.8 58.6 | E. D. F. Cr. |
| | | $s_{12}=12.86$ | | | |
| M | $r_{35}=+20.404$ $r_{36}=-3.947$ $r_{37}=-8.820$ | $t_{21}=2.00$ $t_{22}=0.45$ | 1.523 1.649 | 58.6 33.8 | Cr. E. D. F. |
| | | $s_{13}=14.18$ | | | |
| N | $r_{38}=+8.820$ $r_{39}=+3.947$ $r_{40}=-20.404$ | $t_{23}=0.45$ $t_{24}=2.00$ | 1.649 1.523 | 33.8 58.6 | E. D. F. Cr. |
| | | $s_{14}=12.86$ | | | |
| O | $r_{41}=+20.404$ $r_{42}=-3.947$ $r_{43}=-8.820$ | $t_{25}=2.00$ $t_{26}=0.45$ | 1.523 1.649 | 58.6 33.8 | Cr. E. D. F. |
| | | $s_{15}=13.52$ | | | |
| P | $r_{44}=+20.404$ $r_{45}=-3.947$ $r_{46}=-8.820$ | $t_{27}=2.00$ $t_{28}=0.45$ | 1.523 1.649 | 58.6 33.8 | Cr. E. D. F. |
| | | $s_{16}=14.18$ | | | |
| Q | $r_{47}=+8.820$ $r_{48}=+3.947$ $r_{49}=-20.404$ | $t_{29}=0.45$ $t_{30}=2.00$ | 1.649 1.523 | 33.8 58.6 | E. D. F. Cr. |
| | | $s_{17}=13.52$ | | | |
| R | $r_{50}=+8.820$ $r_{51}=+3.947$ $r_{52}=-20.404$ | $t_{31}=0.45$ $t_{32}=2.00$ | 1.649 1.523 | 33.8 58.6 | E. D. F. Cr. |
| | | $s_{18}=12.86$ | | | |
| S | $r_{53}=+20.404$ $r_{54}=-3.947$ $r_{55}=-8.820$ | $t_{33}=2.00$ $t_{34}=0.45$ | 1.523 1.649 | 58.6 33.8 | Cr. E. D. F. |
| | | $s_{19}=14.18$ | | | |
| T | $r_{56}=+8.820$ $r_{57}=+3.947$ $r_{58}=-20.404$ | $t_{35}=0.45$ $t_{36}=2.00$ | 1.649 1.523 | 33.8 58.6 | E. D. F. Cr. |
| | | $s_{20}=12.86$ | | | |
| U | $r_{59}=+20.404$ $r_{60}=-3.947$ $r_{61}=-8.820$ | $t_{37}=2.00$ $t_{38}=0.45$ | 1.523 1.649 | 58.6 33.8 | Cr. E. D. F. |
| | | $s_{21}=13.52$ | | | |
| V | $r_{62}=+20.404$ $r_{63}=-3.948$ $r_{64}=-8.820$ | $t_{39}=2.00$ $t_{40}=0.45$ | 1.523 1.649 | 58.6 33.8 | Cr. E. D. F. | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axis of the lens system; $N_D$ denotes the index of refraction of the optical glass of the lens; and V denotes the dispersion factor of the optical glass of the lens, all of said radii, thicknesses and air gaps being measured in the same linear units.

7. In a gastroscope or the like, a flexible portion and a rigid portion connected to and constituting a continuation of the flexible portion, said flexible portion including a lens system in accordance with the following table:

| Lens | Radii, mm. | Thickness, mm. | $N_D$ | V | Glass |
|---|---|---|---|---|---|
| E | $r_{11}=+8.820$ | $t_5=0.45$ | 1.649 | 33.8 | E. D. F. |
|   | $r_{12}=+3.947$ |   |   |   |   |
|   | $r_{13}=-20.404$ | $t_6=2.00$ | 1.523 | 58.6 | Cr. |
|   |   | $s_5=13.52$ |   |   |   |
| F | $r_{14}=+8.820$ | $t_7=0.45$ | 1.649 | 33.8 | E. D. F. |
|   | $r_{15}=+3.947$ |   |   |   |   |
|   | $r_{16}=-20.404$ | $t_8=2.00$ | 1.523 | 58.6 | Cr. |
|   |   | $s_6=12.86$ |   |   |   |
| G | $r_{17}=+20.404$ | $t_9=2.00$ | 1.523 | 58.6 | Cr. |
|   | $r_{18}=-3.947$ |   |   |   |   |
|   | $r_{19}=-8.820$ | $t_{10}=0.45$ | 1.649 | 33.8 | E. D. F. |
|   |   | $s_7=14.8$ |   |   |   |
| H | $r_{20}=+8.820$ | $t_{11}=0.45$ | 1.649 | 33.8 | E. D. F. |
|   | $r_{21}=+3.947$ |   |   |   |   |
|   | $r_{22}=-20.404$ | $t_{12}=2.00$ | 1.523 | 58.6 | Cr. |
|   |   | $s_8=12.86$ |   |   |   |
| I | $r_{23}=+20.404$ | $t_{13}=2.00$ | 1.523 | 58.6 | Cr. |
|   | $r_{24}=-3.947$ |   |   |   |   |
|   | $r_{25}=-8.820$ | $t_{14}=0.45$ | 1.649 | 33.8 | E. D. F. |
|   |   | $s_9=13.52$ |   |   |   |
| J | $r_{26}=+20.404$ | $t_{15}=2.00$ | 1.523 | 58.6 | Cr. |
|   | $r_{27}=-3.947$ |   |   |   |   |
|   | $r_{28}=-8.820$ | $t_{16}=0.45$ | 1.649 | 33.8 | E. D. F. |
|   |   | $s_{10}=14.18$ |   |   |   |
| K | $r_{29}=+8.820$ | $t_{17}=0.45$ | 1.649 | 33.8 | E. D. F. |
|   | $r_{30}=+3.947$ |   |   |   |   |
|   | $r_{31}=-20.404$ | $t_{18}=2.00$ | 1.523 | 58.6 | Cr. |
|   |   | $s_{11}=13.52$ |   |   |   |
| L | $r_{32}=+8.820$ | $t_{19}=0.45$ | 1.649 | 33.8 | E. D. F. |
|   | $r_{33}=+3.947$ |   |   |   |   |
|   | $r_{34}=-20.404$ | $t_{20}=2.00$ | 1.523 | 58.6 | Cr. |
|   |   | $s_{12}=12.86$ |   |   |   |
| M | $r_{35}=+20.404$ | $t_{21}=2.00$ | 1.523 | 58.6 | Cr. |
|   | $r_{36}=-3.947$ |   |   |   |   |
|   | $r_{37}=-8.820$ | $t_{22}=0.45$ | 1.649 | 33.8 | E. D. F. |
|   |   | $s_{13}=14.18$ |   |   |   |
| N | $r_{38}=+8.820$ | $t_{23}=0.45$ | 1.649 | 33.8 | E. D. F. |
|   | $r_{39}=+3.947$ |   |   |   |   |
|   | $r_{40}=-20.404$ | $t_{24}=2.00$ | 1.523 | 58.6 | Cr. |
|   |   | $s_{14}=12.86$ |   |   |   |
| O | $r_{41}=+20.404$ | $t_{25}=2.00$ | 1.523 | 58.6 | Cr. |
|   | $r_{42}=-3.947$ |   |   |   |   |
|   | $r_{43}=-8.820$ | $t_{26}=0.45$ | 1.649 | 33.8 | E. D. F. |
|   |   | $s_{15}=13.52$ |   |   |   |
| P | $r_{44}=+20.404$ | $t_{27}=2.00$ | 1.523 | 58.6 | Cr. |
|   | $r_{45}=-3.947$ |   |   |   |   |
|   | $r_{46}=-8.820$ | $t_{28}=0.45$ | 1.649 | 33.8 | E. D. F. |
|   |   | $s_{16}=14.18$ |   |   |   |
| Q | $r_{47}=+8.820$ | $t_{29}=0.45$ | 1.649 | 33.8 | E. D. F. |
|   | $r_{48}=+3.947$ |   |   |   |   |
|   | $r_{49}=-20.404$ | $t_{30}=2.00$ | 1.523 | 58.6 | Cr. |
|   |   | $s_{17}=13.52$ |   |   |   |
| R | $r_{50}=+8.820$ | $t_{31}=0.45$ | 1.649 | 33.8 | E. D. F. |
|   | $r_{51}=+3.947$ |   |   |   |   |
|   | $r_{52}=-20.404$ | $t_{32}=2.00$ | 1.523 | 58.6 | Cr. |
|   |   | $s_{18}=12.86$ |   |   |   |
| S | $r_{53}=+20.404$ | $t_{33}=2.00$ | 1.523 | 58.6 | Cr. |
|   | $r_{54}=-3.947$ |   |   |   |   |
|   | $r_{55}=-8.820$ | $t_{34}=0.45$ | 1.649 | 33.8 | E. D. F. |
|   |   | $s_{19}=14.18$ |   |   |   |
| T | $r_{56}=+8.820$ | $t_{35}=0.45$ | 1.649 | 33.8 | E. D. F. |
|   | $r_{57}=+3.947$ |   |   |   |   |
|   | $r_{58}=-20.404$ | $t_{36}=2.00$ | 1.523 | 58.6 | Cr. |
|   |   | $s_{20}=12.86$ |   |   |   |
| U | $r_{59}=+20.404$ | $t_{37}=2.00$ | 1.523 | 58.6 | Cr. |
|   | $r_{60}=-3.947$ |   |   |   |   |
|   | $r_{61}=-8.820$ | $t_{38}=0.45$ | 1.649 | 33.8 | E. D. F. |
|   |   | $s_{21}=13.52$ |   |   |   |
| V | $r_{62}=+20.404$ | $t_{39}=2.00$ | 1.523 | 58.6 | Cr. |
|   | $r_{63}=-3.947$ |   |   |   |   |
|   | $r_{64}=-8.820$ | $t_{40}=0.45$ | 1.649 | 33.8 | E. D. F. | said rigid portion including a lens system in accordance with the following table:

| Lens | Radii, mm. | Thickness, mm. | $N_D$ | V | Glass |
|---|---|---|---|---|---|
| W | $r_{65}=+20.158$ | $t_{41}=0.45$ | 1.649 | 33.8 | E. D. F. |
|   | $r_{66}=+6.204$ |   |   |   |   |
|   | $r_{67}=-9.294$ | $t_{42}=2.00$ | 1.517 | 64.5 | B. S. C. |
|   |   | $s_{22}=21.96$ |   |   |   |
| X | $r_{68}=\infty$ | $t_{43}=2.50$ | 1.523 | 58.6 | Cr. |
|   | $r_{69}=-19.444$ |   |   |   |   |
|   |   | $s_{24}=26.05$ |   |   |   |
| Y | $r_{70}=+24.334$ | $t_{44}=2.50$ | 1.523 | 58.6 | Cr. |
|   | $r_{71}=\infty$ |   |   |   |   |
|   |   | $s_{25}=96.76$ |   |   |   |
| Z | $r_{72}=+115.610$ | $t_{45}=2.50$ | 1.523 | 58.6 | Cr. |
|   | $r_{73}=-24.010$ |   |   |   |   |
|   | $r_{74}=-34.724$ | $t_{46}=1.00$ | 1.649 | 33.8 | E. D. F. |
|   |   | $s_{26}=90.00$ |   |   |   |
| $A_1$ | $r_{75}=+34.724$ | $t_{47}=1.00$ | 1.649 | 33.8 | E. D. F. |
|   | $r_{76}=+24.010$ |   |   |   |   |
|   | $r_{77}=-115.610$ | $t_{48}=2.50$ | 1.523 | 58.6 | Cr. |
|   |   | $s_{27}=95.43$ |   |   |   |
| $B_1$ | $r_{78}=\infty$ | $t_{49}=2.25$ | 1.523 | 58.6 | Cr. |
|   | $r_{79}=-20.278$ |   |   |   |   |
|   |   | $s_{28}=21.70$ |   |   |   |
| $C_1$ | $r_{80}=+16.203$ | $t_{50}=2.25$ | 1.523 | 58.6 | Cr. |
|   | $r_{81}=\infty$ |   |   |   |   | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axis of the lens system; $N_D$ denotes the index of refraction of the optical glass of the lens; and V denotes the dispersion factor of the optical glass of the lens, all of said radii, thicknesses and air gaps being measured in the same linear units.

8. In a gastroscope or the like, a rigid forward portion, a rigid rearward portion and a flexible portion connected to and positioned intermediate the forward and rearward portions, said forward portion including a lens system in accordance with the following table:

| Lens | Radii, mm. | Thickness, mm. | $N_D$ | V | Glass |
|---|---|---|---|---|---|
| A | $r_1=\infty$ | $t_1=0.5$ | 1.517 | 64.5 | B. S. C. |
|   | $r_2=+3.102$ |   |   |   |   |
|   |   | $s_1=5.0$ |   |   |   |
| B | $r_3=\infty$ |   | 1.617 | 55.0 | D. B. C. |
|   | $r_4=\infty$ |   |   |   |   |
|   | $r_5=\infty$ |   |   |   |   |
|   |   | $s_2=16.16$ |   |   |   |
| C | $r_6=\infty$ | $t_2=1.50$ | 1.517 | 64.5 | B. S. C. |
|   | $r_7=-15.51$ |   |   |   |   |
|   |   | $s_3=1.0$ |   |   |   |
| D | $r_8=+9.294$ | $t_3=2.00$ | 1.517 | 64.5 | B. S. C. |
|   | $r_9=-6.204$ |   |   |   |   |
|   | $r_{10}=-20.158$ | $t_4=0.45$ | 1.649 | 33.8 | E. D. F. | said intermediate portion including a lens system in accordance with the following table:

| Lens | Radii, mm. | Thickness, mm. | $N_D$ | V | Glass |
|---|---|---|---|---|---|
| E | $r_{11}=+8.820$ | $t_5=0.45$ | 1.649 | 33.8 | E. D. F. |
|   | $r_{12}=+3.947$ |   |   |   |   |
|   | $r_{13}=-20.404$ | $t_6=2.00$ | 1.523 | 58.6 | Cr. |
|   |   | $s_5=13.52$ |   |   |   |
| F | $r_{14}=+8.820$ | $t_7=0.45$ | 1.649 | 33.8 | E. D. F. |
|   | $r_{15}=+3.947$ |   |   |   |   |
|   | $r_{16}=-20.404$ | $t_8=2.00$ | 1.523 | 58.6 | Cr. |
|   |   | $s_6=12.86$ |   |   |   |
| G | $r_{17}=+20.404$ | $t_9=2.00$ | 1.523 | 58.6 | Cr. |
|   | $r_{18}=-3.947$ |   |   |   |   |
|   | $r_{19}=-8.820$ | $t_{10}=0.45$ | 1.649 | 33.8 | E. D. F. |
|   |   | $s_7=14.8$ |   |   |   |
| H | $r_{20}=+8.820$ | $t_{11}=0.45$ | 1.649 | 33.8 | E. D. F. |
|   | $r_{21}=+3.947$ |   |   |   |   |
|   | $r_{22}=-20.404$ | $t_{12}=2.00$ | 1.523 | 58.6 | Cr. |
|   |   | $s_8=12.86$ |   |   |   |
| I | $r_{23}=+20.404$ | $t_{13}=2.00$ | 1.523 | 58.6 | Cr. |
|   | $r_{24}=-3.947$ |   |   |   |   |
|   | $r_{25}=-8.820$ | $t_{14}=0.45$ | 1.649 | 33.8 | E. D. F. |
|   |   | $s_9=13.52$ |   |   |   |
| J | $r_{26}=+20.404$ | $t_{15}=2.00$ | 1.523 | 58.6 | Cr. |
|   | $r_{27}=-3.947$ |   |   |   |   |
|   | $r_{28}=-8.820$ | $t_{16}=0.45$ | 1.649 | 33.8 | E. D. F. |
|   |   | $s_{10}=14.18$ |   |   |   |
| K | $r_{29}=+8.820$ | $t_{17}=0.45$ | 1.649 | 33.8 | E. D. F. |
|   | $r_{30}=+3.947$ |   |   |   |   |
|   | $r_{31}=-20.404$ | $t_{18}=2.00$ | 1.523 | 58.6 | Cr. |
|   |   | $s_{11}=13.52$ |   |   |   |
| L | $r_{32}=+8.820$ | $t_{19}=0.45$ | 1.649 | 33.8 | E. D. F. |
|   | $r_{33}=+3.947$ |   |   |   |   |
|   | $r_{34}=-20.404$ | $t_{20}=2.00$ | 1.523 | 58.6 | Cr. |
|   |   | $s_{12}=12.86$ |   |   |   |
| M | $r_{35}=+20.404$ | $t_{21}=2.00$ | 1.523 | 58.6 | Cr. |
|   | $r_{36}=-3.947$ |   |   |   |   |
|   | $r_{37}=-8.820$ | $t_{22}=0.45$ | 1.649 | 33.8 | E. D. F. |
|   |   | $s_{13}=14.18$ |   |   |   |
| N | $r_{38}=+8.820$ | $t_{23}=0.45$ | 1.649 | 33.8 | E. D. F. |
|   | $r_{39}=+3.947$ |   |   |   |   |
|   | $r_{40}=-20.404$ | $t_{24}=2.00$ | 1.523 | 58.6 | Cr. |
|   |   | $s_{14}=12.86$ |   |   |   |
| O | $r_{41}=+20.404$ | $t_{25}=2.00$ | 1.523 | 58.6 | Cr. |
|   | $r_{42}=-3.947$ |   |   |   |   |
|   | $r_{43}=-8.820$ | $t_{26}=0.45$ | 1.649 | 33.8 | E. D. F. |
|   |   | $s_{15}=13.52$ |   |   |   |
| P | $r_{44}=+20.404$ | $t_{27}=2.00$ | 1.523 | 58.6 | Cr. |
|   | $r_{45}=-3.947$ |   |   |   |   |
|   | $r_{46}=-8.820$ | $t_{28}=0.45$ | 1.649 | 33.8 | E. D. F. |
|   |   | $s_{16}=14.18$ |   |   |   |
| Q | $r_{47}=+8.820$ | $t_{29}=0.45$ | 1.649 | 33.8 | E. D. F. |
|   | $r_{48}=+3.947$ |   |   |   |   |
|   | $r_{49}=-20.404$ | $t_{30}=2.00$ | 1.523 | 58.6 | Cr. |
|   |   | $s_{17}=13.52$ |   |   |   |
| R | $r_{50}=+8.820$ | $t_{31}=0.45$ | 1.649 | 33.8 | E. D. F. |
|   | $r_{51}=+3.947$ |   |   |   |   |
|   | $r_{52}=-20.404$ | $t_{32}=2.00$ | 1.523 | 58.6 | Cr. |
|   |   | $s_{18}=12.86$ |   |   |   |
| S | $r_{53}=+20.404$ | $t_{33}=2.00$ | 1.523 | 58.6 | Cr. |
|   | $r_{54}=-3.947$ |   |   |   |   |
|   | $r_{55}=-8.820$ | $t_{34}=0.45$ | 1.649 | 33.8 | E. D. F. |
|   |   | $s_{19}=14.18$ |   |   |   |

| Lens | Radii, mm. | Thickness, mm. | $N_D$ | V | Glass |
|---|---|---|---|---|---|
| T | $r_{56}=+\ 8.820$ | $t_{35}=\ 0.45$ | 1.649 | 33.8 | E. D. F. |
|   | $r_{57}=+\ 3.947$ | $t_{36}=\ 2.00$ | 1.523 | 58.6 | Cr. |
|   | $r_{58}=-20.404$ | $s_{20}=12.86$ | | | |
| U | $r_{59}=+20.404$ | $t_{37}=\ 2.00$ | 1.523 | 58.6 | Cr. |
|   | $r_{60}=-\ 3.947$ | $t_{38}=\ 0.45$ | 1.649 | 33.8 | E. D. F. |
|   | $r_{61}=-\ 8.820$ | $s_{21}=13.52$ | | | |
| V | $r_{62}=+20.404$ | $t_{39}=\ 2.00$ | 1.523 | 58.6 | Cr. |
|   | $r_{63}=-\ 3.947$ | $t_{40}=\ 0.45$ | 1.649 | 33.8 | E. D. F. |
|   | $r_{64}=-\ 8.820$ | | | | | and said rearward portion including a lens system in accordance with the following stable:

| Lens | Radii, mm. | Thickness, mm. | $N_D$ | V | Glass |
|---|---|---|---|---|---|
| W | $r_{65}=+\ 20.158$ | $t_{41}=\ 0.45$ | 1.649 | 33.8 | E. D. F. |
|   | $r_{66}=+\ 6.204$ | $t_{42}=\ 2.00$ | 1.517 | 64.5 | B. S. C. |
|   | $r_{67}=-\ 9.294$ | $s_{23}=21.96$ | | | |
| X | $r_{68}=\infty$ | $t_{43}=\ 2.50$ | 1.523 | 58.6 | Cr. |
|   | $r_{69}=-\ 19.444$ | $s_{24}=26.05$ | | | |
| Y | $r_{70}=+\ 24.334$ | $t_{44}=\ 2.50$ | 1.523 | 58.6 | Cr. |
|   | $r_{71}=\infty$ | $s_{25}=96.76$ | | | |
| Z | $r_{72}=+115.610$ | $t_{45}=\ 2.50$ | 1.523 | 58.6 | Cr. |
|   | $r_{73}=-\ 24.010$ | $t_{46}=\ 1.00$ | 1.649 | 33.8 | E. D. F. |
|   | $r_{74}=-\ 34.724$ | $s_{26}=90$ | | | |
| $A_1$ | $r_{75}=+\ 34.724$ | $t_{47}=\ 1.00$ | 1.649 | 33.8 | E. D. F. |
|   | $r_{76}=+\ 24.010$ | $t_{48}=\ 2.50$ | 1.523 | 58.6 | Cr. |
|   | $r_{77}=-115.610$ | $s_{27}=95.43$ | | | |
| $B_1$ | $r_{78}=\infty$ | $t_{49}=\ 2.25$ | 1.523 | 58.6 | Cr. |
|   | $r_{79}=-\ 20.278$ | $s_{28}=21.70$ | | | |
| $C_1$ | $r_{80}=+\ 16.203$ | $t_{50}=\ 2.25$ | 1.523 | 58.6 | Cr. |
|   | $r_{81}=\infty$ | | | | | wherein $r$ indicates the radius of a spherical surface on the face of the lens, positive and negative radii indicating surfaces that are convex forwardly and rearwardly, respectively; $t$ indicates the thickness of the lens; $s$ indicates the air gap between successive lenses measured on the axes of the lenses, the axes of lenses C to $C_1$, inclusive, being substantially coincident and normal to the axis of lens A; $N_D$ denotes the index of refraction of the optical glass of the lens; and V denotes the dispersion factor of the optical glass of the lens, all of said radii, thicknesses and air gaps being measured in the same linear units.

JOHN H. HETT.

REFERENCES CITED

The following references are of record in the file of this patent:

UNITED STATES PATENTS

| Number | Name | Date |
|---|---|---|
| 849,344 | Wappler | Apr. 2, 1907 |
| 940,894 | Van Rohr | Nov. 23, 1909 |
| 964,703 | Smith | July 19, 1910 |
| 984,929 | Kellner | Feb. 21, 1911 |
| 1,643,719 | Loeck | Sept. 27, 1927 |
| 1,706,930 | Loeck | Mar. 26, 1929 |
| 1,741,575 | Leiter | Dec. 31, 1929 |
| 2,325,831 | Cameron | Aug. 3, 1943 |

Certificate of Correction

August 22, 1950

Patent No. 2,519,760

JOHN H. HETT

It is hereby certified that error appears in the printed specification of the above numbered patent requiring correction as follows:

Column 1, line 49, for "though" read *through*; column 2, line 21, for "illustated" read *illustrated*; column 8, line 11, for "6.820" read *8.820*; line 25, for "+3.947" read *—3.947*; line 57, for "3.948" read *3.947*; column 10, line 43, for "$t_{10}$—" read $t_{10}=$;

and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*